United States Patent
Sasaki

(10) Patent No.: US 8,659,544 B2
(45) Date of Patent: Feb. 25, 2014

(54) PORTABLE INFORMATION TERMINAL HAVING A METHOD FOR INPUTTING SYMBOLS OR PICTOGRAMS

(75) Inventor: Hiroe Sasaki, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 486 days.

(21) Appl. No.: 12/507,167

(22) Filed: Jul. 22, 2009

(65) Prior Publication Data

US 2009/0280869 A1 Nov. 12, 2009

Related U.S. Application Data

(63) Continuation of application No. 11/236,706, filed on Sep. 27, 2005, now abandoned.

(30) Foreign Application Priority Data

Jan. 28, 2005 (JP) .................................. 2005-20578

(51) Int. Cl.
*G09G 5/00* (2006.01)
(52) U.S. Cl.
USPC ........................................ 345/156; 345/172
(58) Field of Classification Search
USPC ....................................................... 345/156
See application file for complete search history.

(56) References Cited

U.S. PATENT DOCUMENTS

| 6,223,059 | B1 | 4/2001 | Haestrup | |
|---|---|---|---|---|
| 2004/0164951 | A1 | 8/2004 | Lun Pun et al. | |
| 2004/0196266 | A1 | 10/2004 | Matsuura et al. | |
| 2005/0003868 | A1* | 1/2005 | Oh | 455/566 |
| 2005/0156873 | A1* | 7/2005 | Walter et al. | 345/156 |
| 2005/0181777 | A1* | 8/2005 | Kim | 455/418 |

FOREIGN PATENT DOCUMENTS

| JP | 7-175801 A | 7/1995 |
|---|---|---|
| JP | 2003-122486 A | 4/2003 |

* cited by examiner

*Primary Examiner* — Long D Pham
(74) *Attorney, Agent, or Firm* — Maschoff Brennan

(57) ABSTRACT

In a portable information terminal enabling faster entry of frequently used symbols and pictograms, the control unit determines whether the pressing of the "*" key is recognized by the entry unit. If recognized, it is determined whether the mark list display setting is ON. If ON, it is determined whether the symbol and pictogram information stored in the mark list information storage unit is unregistered. If not unregistered, the symbols and characters stored in the mark list information storage unit 115*b* are retrieved and displayed on the display screen. If the pressed key is the center key of the four-way scroll key or the middle softkey, the symbol or pictogram on which the cursor is placed when the center key is pressed is determined as the symbol or pictogram to be entered.

18 Claims, 15 Drawing Sheets

FIG.1A
FIG.1B
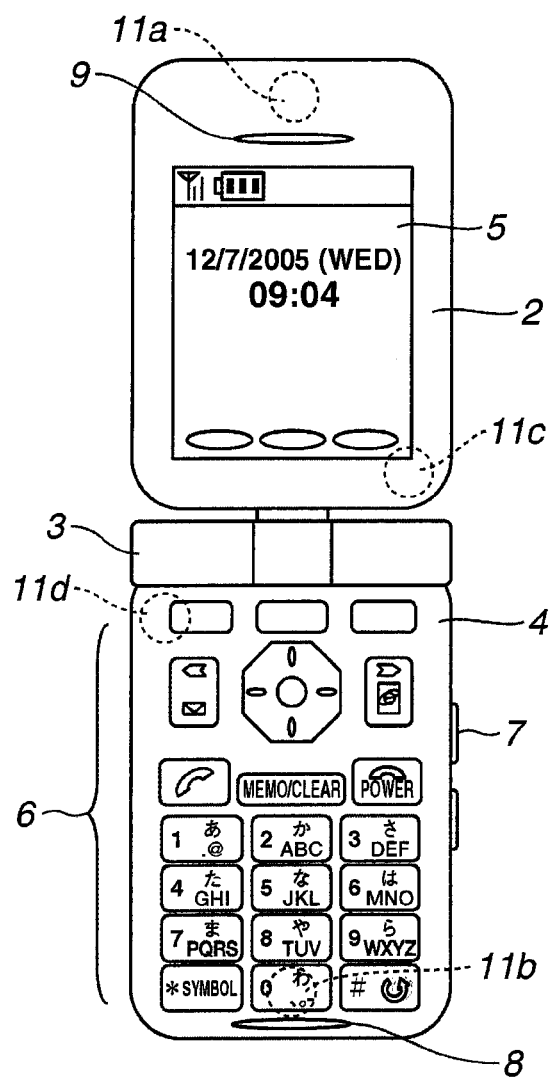
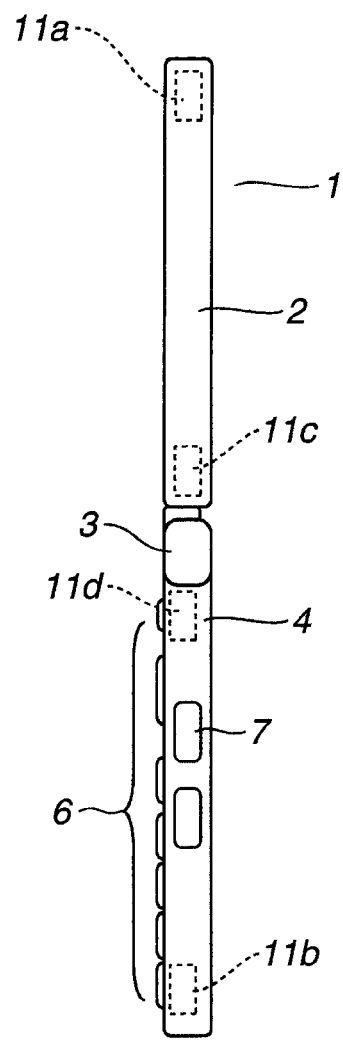

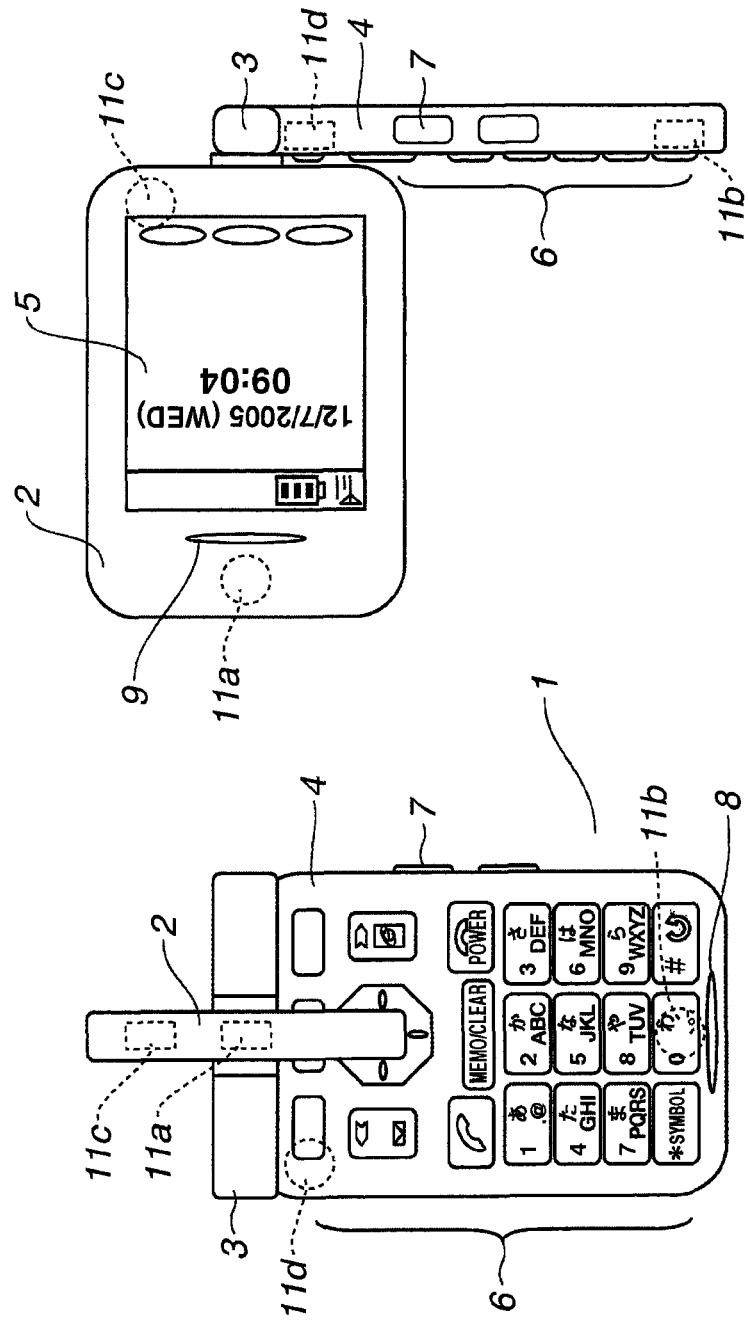

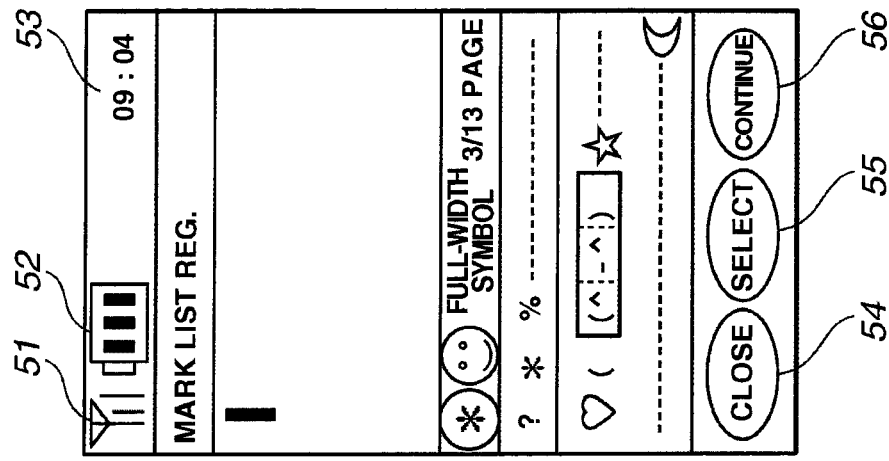
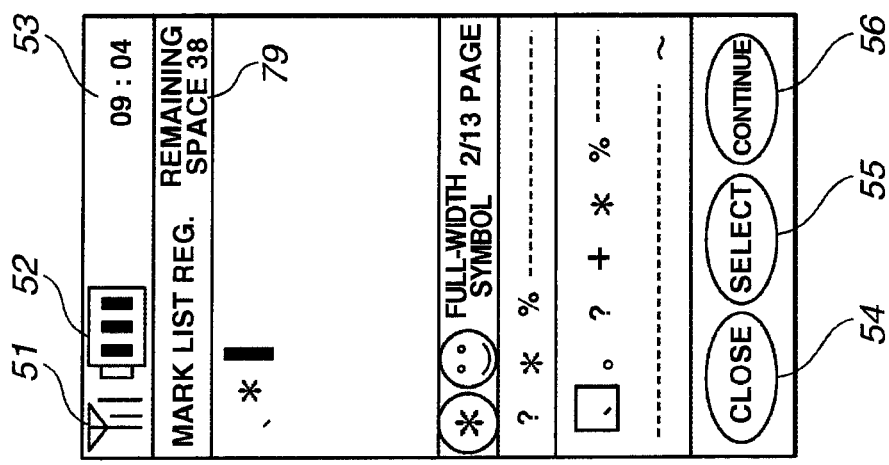
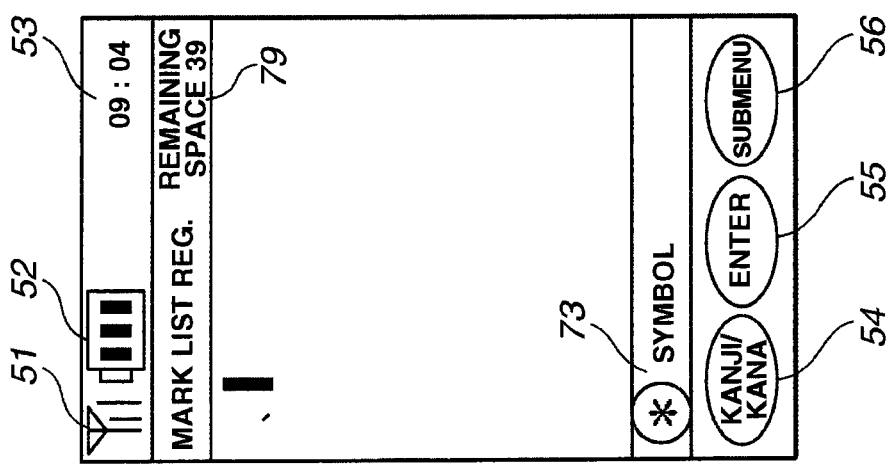

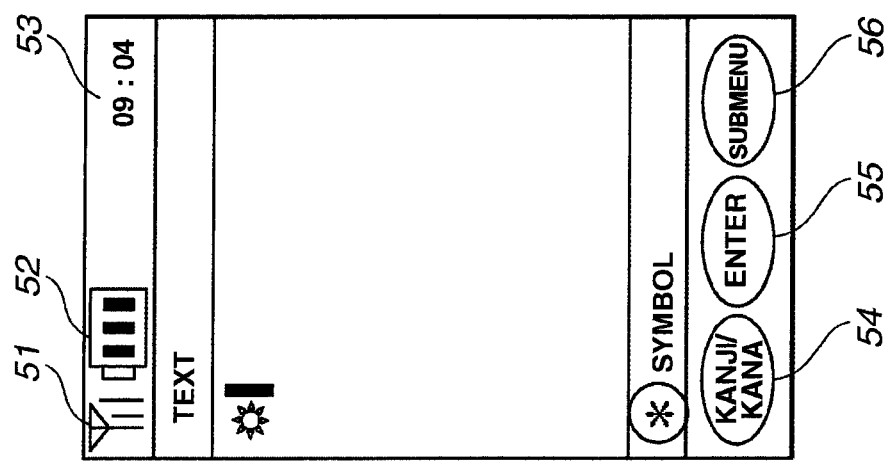
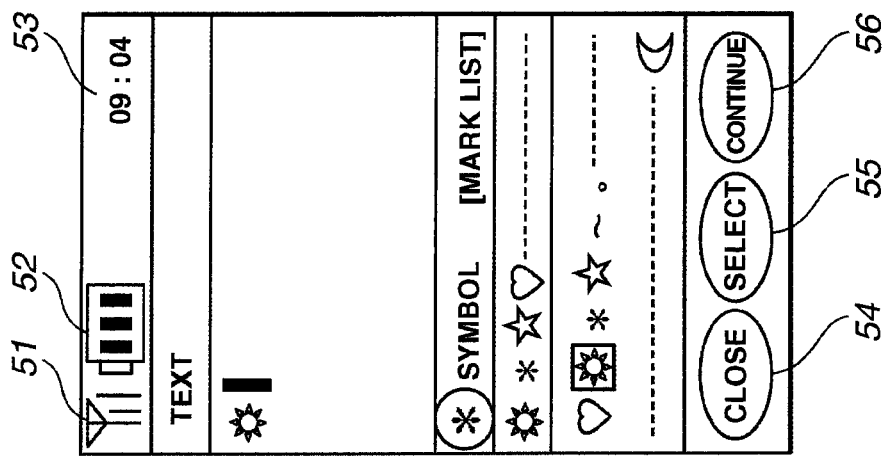
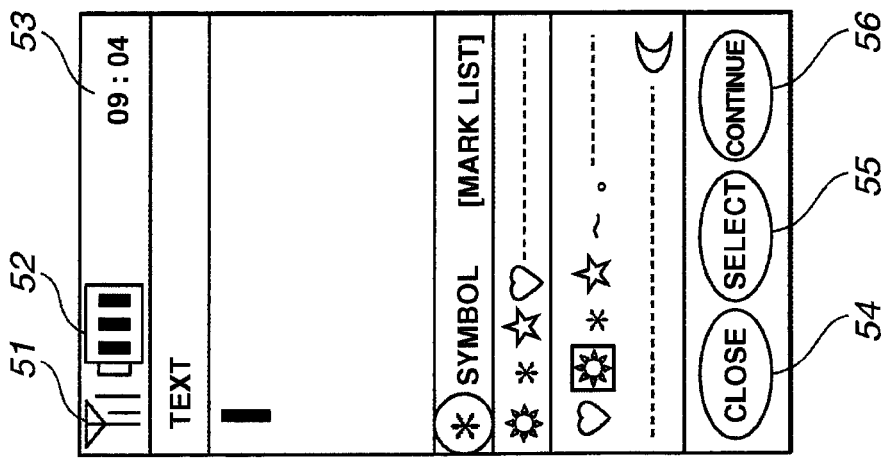

PORTABLE INFORMATION TERMINAL HAVING A METHOD FOR INPUTTING SYMBOLS OR PICTOGRAMS

CROSS-REFERENCE TO RELATED APPLICATIONS

This application is a Continuation Application of U.S. application Ser. No. 11/236,706, filed Sep. 27, 2005, which is based upon and claims the benefit of priority from the prior Japanese Patent Application No. 2005-20578 filed on Jan. 28, 2005, the entire contents of both of which are incorporated herein by reference.

BACKGROUND OF THE INVENTION

1. Field of the Invention

The present invention relates to a portable information terminal, and particularly to a portable information terminal in which symbols and pictograms of frequent use can be entered faster, thereby improving the operability.

2. Description of the Related Art

In recent years, portable information equipment has been remarkably developed and popularized. In particular, mobile phones, although they have the limited number of entry keys, are enabled to enter letters and characters by using various methods, such as, by assigning plural characters to each key and then switching these plural types of characters, and by using the toggle method in which the characters assigned to each key is switched according to a number of key pressing.

In these methods, characters such as Japanese Kana characters, numeric, and alphabet characters are directly assigned to keys. These characters can be entered easily by pressing numeric keys on a character entry screen. However, the entry of symbols and pictograms requires a user to select his/her desired one from a list of symbols or a list of pictograms, for example, by using a character entry method as disclosed in Japanese Patent Application Publication No. 2003-122486.

Thus, according to such conventional character entry methods, every time the user wants to enter a symbol or pictogram, whether it is of frequent use or not, the user has to refer to a symbol list or pictogram list to select his/her desired one. Therefore, the operability is very poor.

SUMMARY OF THE INVENTION

Accordingly, an advantage of an aspect of the present invention is to provide a portable information terminal enabling faster entry of frequently used symbols and pictograms.

To achieve the above advantage, an aspect of the present invention, a portable information terminal comprises a first memory configured to store symbol information or pictogram information; a display configured to display a list of the symbol information or the pictogram information stored in the first memory; an entry unit configured to select a symbol or a pictogram from the list of the symbol information or the pictogram information displayed on the display; a storage control unit configured to store information on the symbol or the pictogram selected by the entry unit in a second memory; if a symbol or a pictogram is selected by the entry unit from the list of the symbol information or the pictogram information displayed on the display, a display control unit configured to display the symbol information or the pictogram information stored in the second memory if a predetermined operation has been executed by the entry unit during an entry of characters; and an entry control unit configured to accepts the symbol information or pictogram information as an entry of the symbol or pictogram which has been selected, if the symbol information or the pictogram information displayed by the display control unit is selected by the entry unit.

In accordance with the aspect of the present invention, a portable information terminal enables predetermined symbols and pictograms to be entered more rapidly.

BRIEF DESCRIPTION OF THE DRAWINGS

FIGS. 1A and 1B show the structure of a mobile phone 1 (an embodiment of the portable information terminal of the present invention) when opened 180 degrees, FIG. 1A being a front view, and FIG. 1B being a side view;

FIGS. 3A and 3B show the structure of the mobile phone 1 when the upper housing 2 is further rotated by 90 degrees from the state shown in FIGS. 2A and 2B, FIG. 3A being a front view, and FIG. 3B being a side view;

FIGS. 9A to 9C show an example of display on the display screen 5 when a mark list is registered manually;

FIGS. 10A to 10C show an example of display on the display screen when symbols and pictograms are entered using the mark list;

DETAILED DESCRIPTION OF THE INVENTION

Embodiment of the present invention applied to a mobile phone will be described with reference to the attached drawings.

FIGS. 1 to 5 show external appearances of a mobile phone 1. FIG. 6 is a block diagram of the mobile phone 1.

The structure of the mobile phone 1 will be described with reference to FIGS. 1 to 5.

FIGS. 1A and 1B are external views of the mobile phone 1 which has been opened about 180 degrees. FIG. 1A is a front view and FIG. 1B is a side view thereof.

Figure 2A:
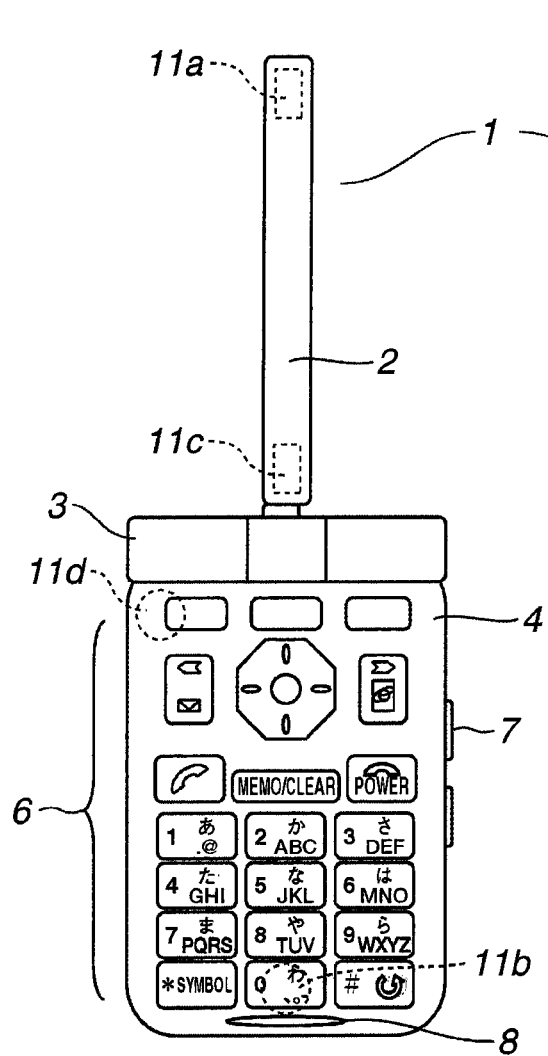
FIGS. 2A and 2B show the structure of the mobile phone 1 when an upper housing 2 is rotated by 90 degrees, FIG. 2A being a front view, and FIG. 2B being a side view.
Figure 2B:
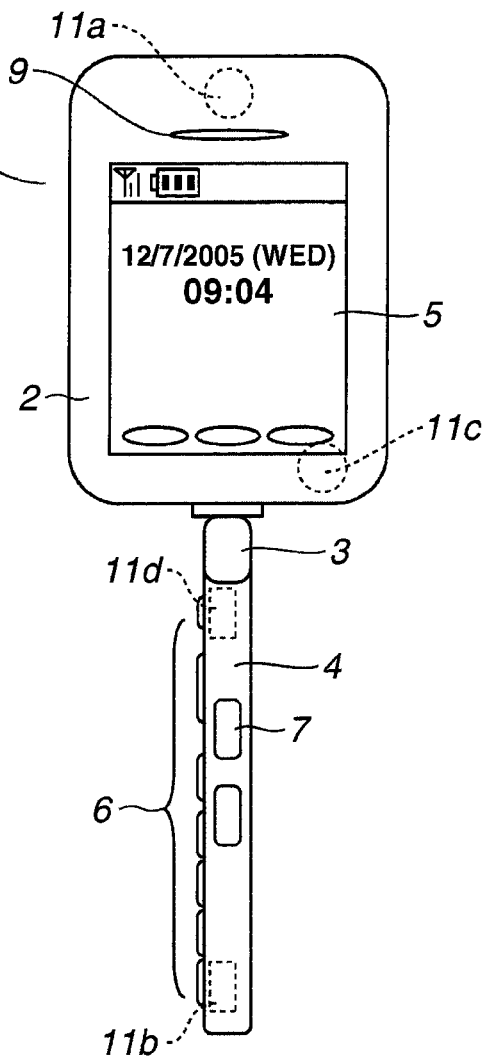

FIGS. 2A and 2B show the mobile phone 1, in which an upper housing 2 has been rotated, from the state in FIGS. 1A and 1B, by 90 degrees around an axis B which is perpendicular to an axis A along which the mobile phone 1 is opened and closed. FIG. 2A is a front view and FIG. 2B is a side view thereof.

FIGS. 3A and 3B show the mobile phone 1 in which the upper housing 2 has been rotated, from the state in FIGS. 2A and 2B, by 90 degrees around the axis A along which the mobile phone is opened and closed. FIG. 3A is a front view and FIG. 3B is a side view thereof.

Figure 4A:
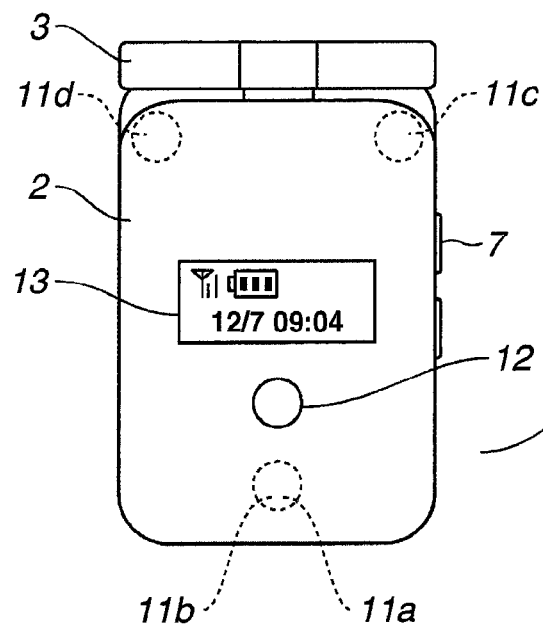
FIGS. 4A and 4B show the structure of the mobile phone 1 when closed, FIG. 4A being a front view and FIG. 4B being a side view.
Figure 4B:
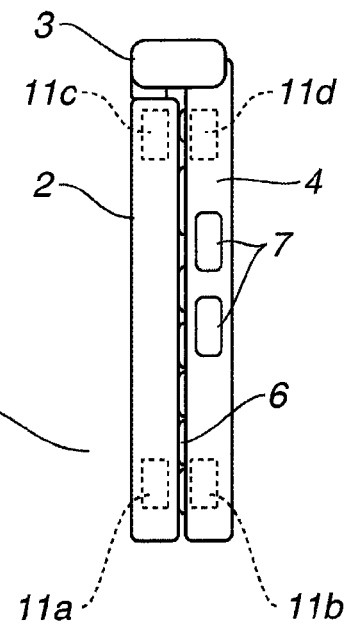

FIGS. 4A and 4B show the mobile phone 1 when closed. FIG. 4A is a front view and FIG. 4B is a side view thereof.

Figure 5A:
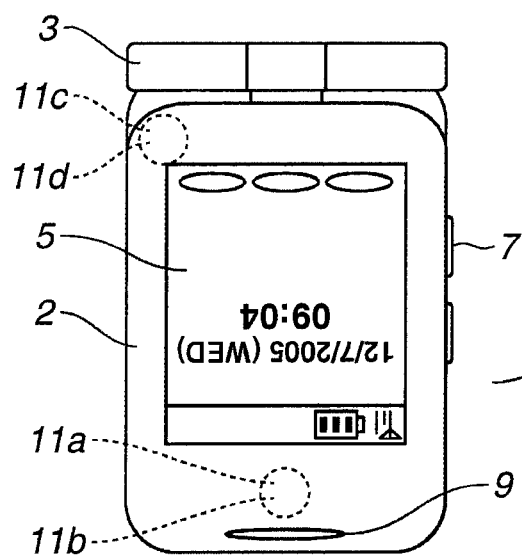
FIGS. 5A and 5B show the structure of the mobile phone 1 when closed from the state shown in FIGS. 3A and 3B, FIG. 5A being a front view and FIG. 5B being a side view.
Figure 5B:
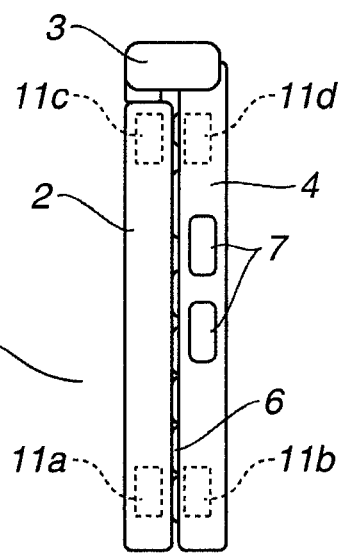
Figure 6:
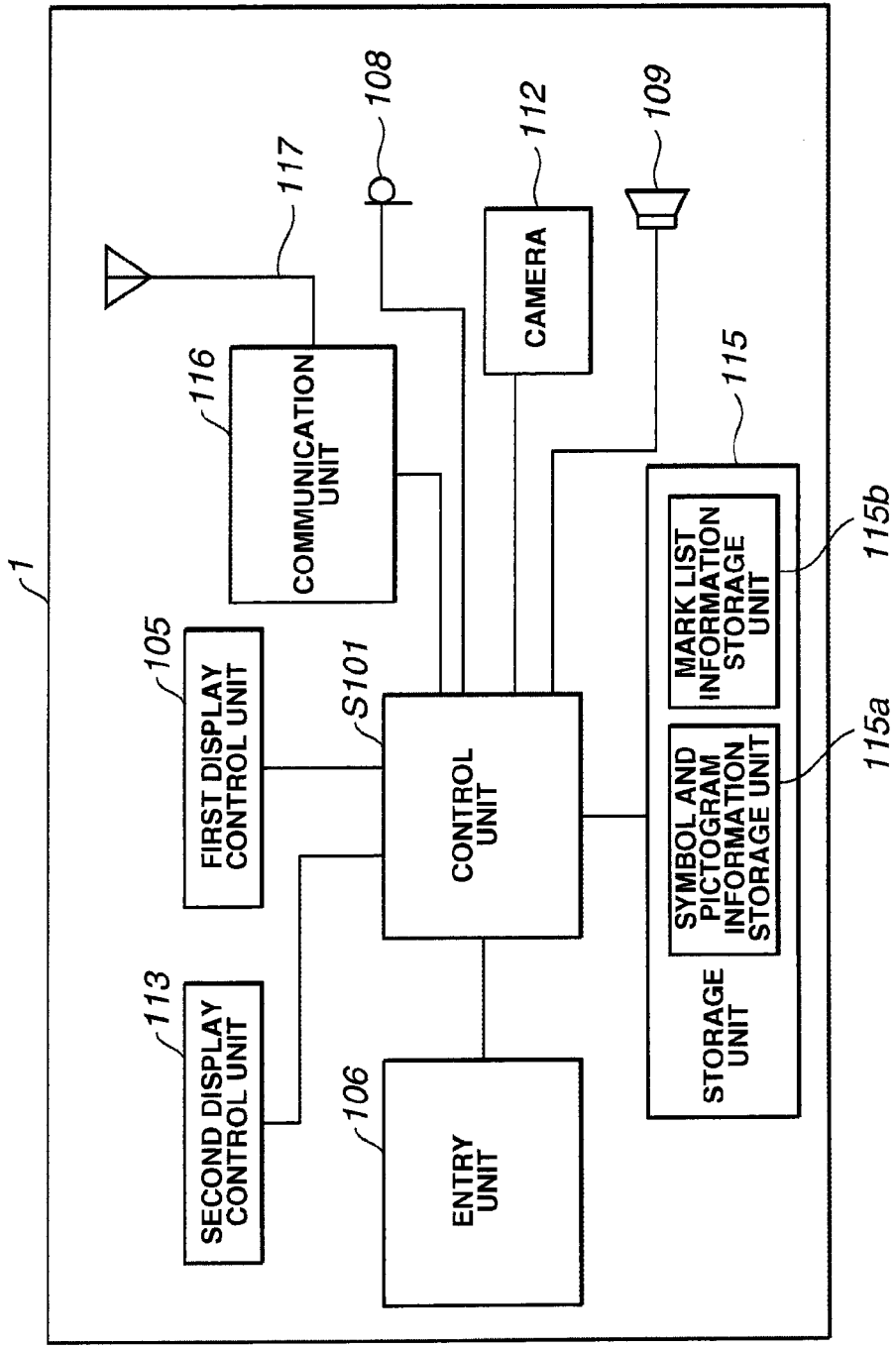
FIG. 6 is a block diagram schematically showing the configuration of the mobile phone 1.

FIGS. 5A and 5B show the state of the mobile phone in which the upper housing 2 has been rotated, from the state in FIGS. 2A and 2B, by 90 degrees around the axis B along which the mobile phone is opened and closed (that is, the upper housing 2 has been rotated, from the state in FIGS. 1A and 1B, by 180 degrees around the axis B), and then the upper housing 2 has been closed along the axis A. FIG. 5A is a front view and FIG. 5B is a side view thereof.

The mobile phone 1 has an upper housing 2 and a lower housing 4 which are coupled to each other by means of a hinge unit 3. The upper housing 2 has a display screen 5 such as an LCD, a receiver 9 for outputting received voice, magnetic sensors 11a and 11c for sensing the state of the mobile phone 1, a camera 12, and a sub-display screen 13 such as an LCD.

The lower housing 4 has keys 6 for entering numeric characters and letters and for inputting operating commands for the mobile phone 1, side keys 7 for operating the mobile phone 1, a microphone (mouth piece) 8 for collecting sound, and magnetic sensors 11b and 11d for sensing the state of the mobile phone 1.

FIG. 6 is a block diagram showing the configuration of the mobile phone 1. The mobile phone 1 includes a control unit 101 for controlling the entire of the mobile phone 1, a storage unit 115 formed by an RAM or the like, a first display control unit 105 for controlling the display of the display screen 5, a second display control unit 113 for controlling the display of the sub-display screen 13, an entry unit 106 for recognizing the pressing of the keys 6 and the side keys 7, and a communication unit 116 for performing wireless communication with the use of an antenna 117. The overall control of the mobile phone 1 is executed by the control unit 101. The reference numeral 108 denotes a microphone corresponding to the microphone 8, and the reference numeral 109 denotes a speaker corresponding to the speaker 9.

The storage unit 115 stores programs executed by the control unit 101 and various information and data. The storage unit 115 includes a symbol and pictogram information storage unit 115a and a mark list information storage unit 115b. The symbol and pictogram information storage unit 115a stores predetermined symbols and pictograms, the display of which is controlled by the first display control unit 105 so that they are displayed on the display screen 5 always in a fixed arrangement and order.

In the initial state, no symbol or pictogram information is stored in the mark list information storage unit 115b. Symbols and pictograms selected and entered by a user of the mobile phone are stored in the mark list information storage unit 115b. The display of these symbols and pictograms is controlled by the first display control unit 105. Information on the order of arranging the symbols and the pictograms when displayed on the display screen 5 is also stored in the mark list information storage unit 115b.

The term "symbol" as used herein includes not only half-width and full-width symbols such as "%" and "&", but also punctuation, commas, full-stops, centered dots, parentheses, and full-width Greek characters, Russian characters, rule marks, and the like.

The first display control unit 105 and the second display control unit 113 control the display screen 5 and the sub-display screen 13, respectively, to control the display of data output and instructed by the control unit 101 on these screens.

The communication unit 116 has functions of wirelessly transmitting information instructed by the control unit 101 and of receiving information which has been wirelessly transmitted by a mail server. In the telephone mode of operation, speech communication is performed by means of the communication unit 116.

The entry unit 106 recognizes the pressing of the keys 6 and the side keys 7. The entry unit 106 is capable of recognizing the pressing of plural keys including numeric keys, character keys, and function keys, for example, for executing or canceling mail editing. In response to a key entry by the user, the entry unit 106 sends an identification signal identifying the pressed key 6 to the control unit 101 so that the control unit 101 starts its operation.

Figure 7A:
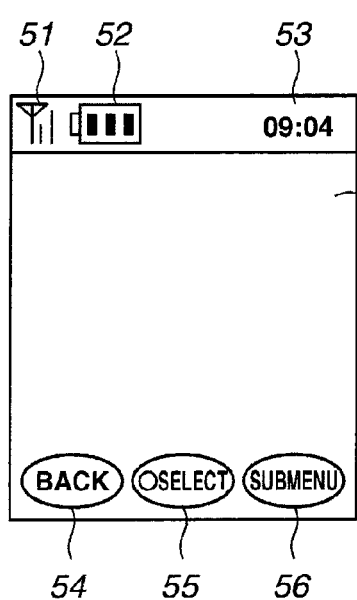
FIG. 7A shows an example of display on a display screen 5 of the mobile phone 1.
Figure 7B:
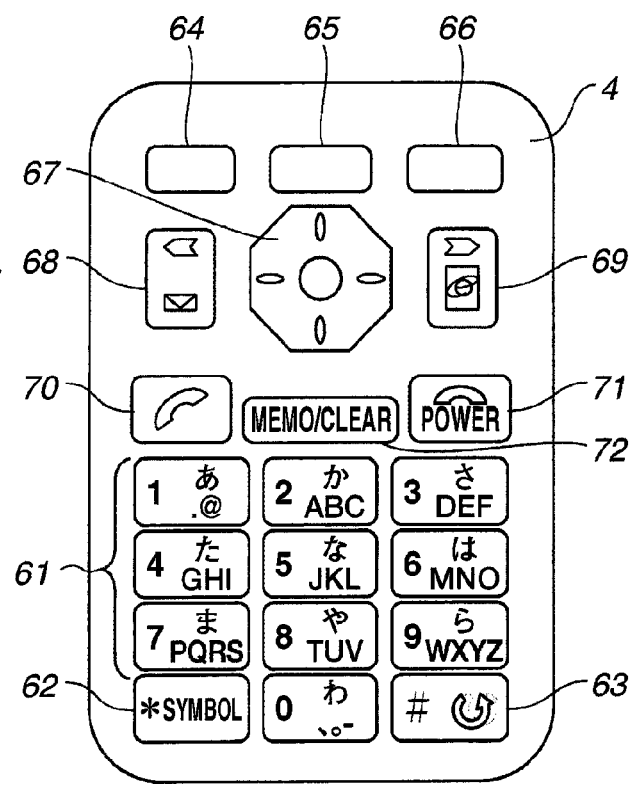
FIG. 7B shows an example of arrangement of keys 6 on a lower housing 4 of the mobile phone 1.

FIG. 7A shows an example of display of the display screen 5 according to the present invention, and FIG. 7B shows an example of arrangement of the keys 6 according to the present invention.

As shown in FIG. 7A, the display screen 5 of the mobile phone 1 has a top row (hereafter, to be referred to as "the upper pictogram row") which displays an antenna pictogram 51 indicating a current sensitivity level of the antenna 117, a battery pictogram 52 indicating a current remaining battery level of the mobile phone 1, and a time display 53 indicating current time. The display screen 5 of the mobile phone 1 further has a bottom row (hereafter, to be referred to as "the lower pictogram row") which includes a lower left pictogram 54, a lower middle pictogram 55, and a lower right pictogram 56. These pictograms give brief explanation of respective functions to be carried out when a left softkey 64, a middle softkey 65, and right softkey 66 are pressed. The lower left pictogram 5 corresponds to the left softkey 64, the lower middle pictogram 55 to the middle softkey 65, and the lower right pictogram 56 to the right softkey 66.

For example, when the display on the display screen 5 is as shown in FIG. 7A, it is known from the pictograms that the "back" function will be executed by pressing the left softkey 64, and the function which is currently highlighted (not shown) will be selected by pressing the middle softkey 65. It is also known that the "submenu" will be displayed by pressing the right softkey 66. The function of the middle softkey 65 can be performed alternatively by pressing a center key located in the middle of a four-way scroll key 67.

As shown in FIG. 7B, the keys 6 on the lower housing 4 include numeric keys 61, a "*" key 62, a "#" key 63, the left softkey 64, the middle softkey 65, the right softkey 66, the four-way scroll key 67, a mail key 68, a browser key 69, a telephone key 70, a power key 71, and a clear key 72.

The numeric keys 61 are assigned with not only numeric characters but also kana characters, symbol characters, alphabets, and the like. For example, the key for "1" is assigned with the numeric character of "1", kana characters representing the sounds of "a", "i", "u", "e" and "o", and the symbols of "." and "@". The key for "2" is assigned with the numeric character of "2", kana characters representing the sounds of "ka", "ki", "ku", "ke" and "ko", and alphabets of "A", "B", "C", "a", "b" and "c".

The "*" key 62 is assigned with the symbol of "*", and also can be pressed in the character entry state to access a symbol list, a pictogram list, and a list of symbols and pictograms stored in the mark list information storage unit 115b (hereafter, to be referred to as the "mark list").

The symbol list, the pictogram list and the mark list will be described later in more detail. The "#" key 63 is assigned with the symbol "#", and also can be pressed in the character entry state to reverse the toggle between character entry modes by the numeric keys 61.

The use of the four-way scroll key 67 enables a cursor to be moved up and down, and to the left and the right. Further, a function to be executed can be selected from among various functions by pressing the central part of the key (hereafter, to be referred to as the "center key"). The mail key 68 is for accessing the mail transmitting and receiving function. The browser key is for connecting the mobile phone 1 to a web site or the like.

The telephone key 70 is used for receiving or transmitting a telephone call. The power key 71 is used for turning power ON and OFF, for terminating a telephone call, and for terminating a function or editing. The clear key 72 is used for clearing a function or editing, and for deleting an entered character during entry of characters. The clear key 72 can be pressed in the standby screen to access the Notepad screen.

Description will now be made of methods of registering a mark list and of entering a symbol or a pictogram during character entry mode operation of the mobile phone 1, with reference to the drawings.

(Manual Mark List Registration)

Figure 12:
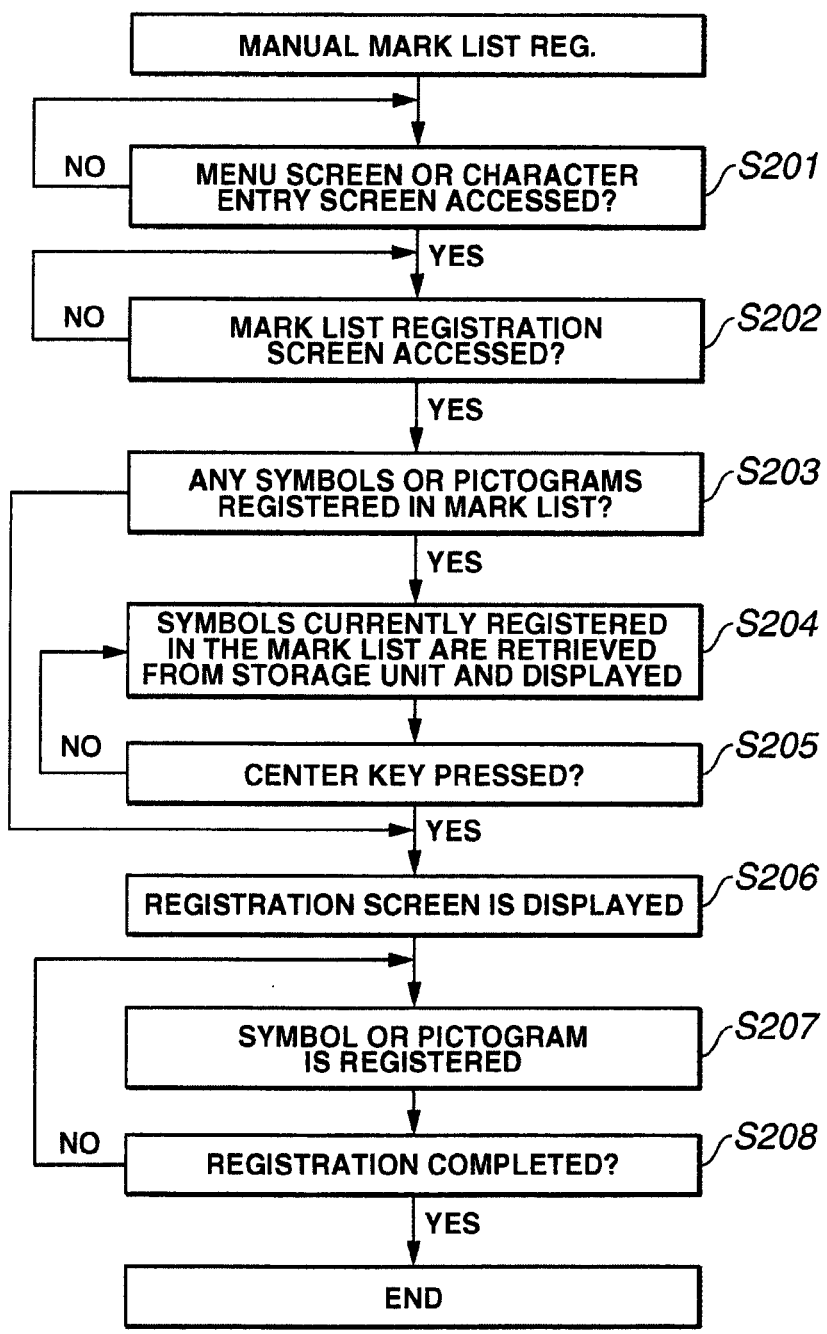
FIG. 12 is a flowchart for registering a mark list manually.

First, description will be made of mark list registration which is carried out during entry of characters. A mark list contains symbols and pictograms which are arranged in the order predetermined by the user. FIG. 12 is a flowchart illustrating manual registration of a mark list.

Manual mark list registration can be started by performing a predetermined operation to access a manual mark list registration screen from a menu screen, or by pressing the right softkey 66 in the character entry screen to access the submenu, from which the registration screen is accessed.

It is determined whether or not an operation has been done to access the menu screen or the character entry screen (step S201). If the operation has been done to access the menu screen or the character entry screen (YES in step S201), it is then determined whether or not an operation has been done to access the mark list registration screen (step S202).

If the operation has been done to access the mark list registration screen (YES in step S202), the control unit 101 determines whether or not symbols and pictograms have been registered in the mark list information storage unit 115b of the storage unit 115 (step S203). If no symbol or pictogram has been registered in the mark list information storage unit 115b (NO in step S203), the processing proceeds to step S206.

If symbols and pictograms have been registered in the mark list information storage unit 115b (YES in step S203), the symbols and pictograms currently registered in the mark list information storage unit 115b are retrieved to be displayed on the display screen 5 (step S204).

It is then determined whether or not the center key has been pressed (step S205). If the center key has been pressed (YES in step S205), the mark list registration screen is displayed on the display screen 5 to enable registration in the mark list information storage unit 115b (step S206).

Figure 8A:
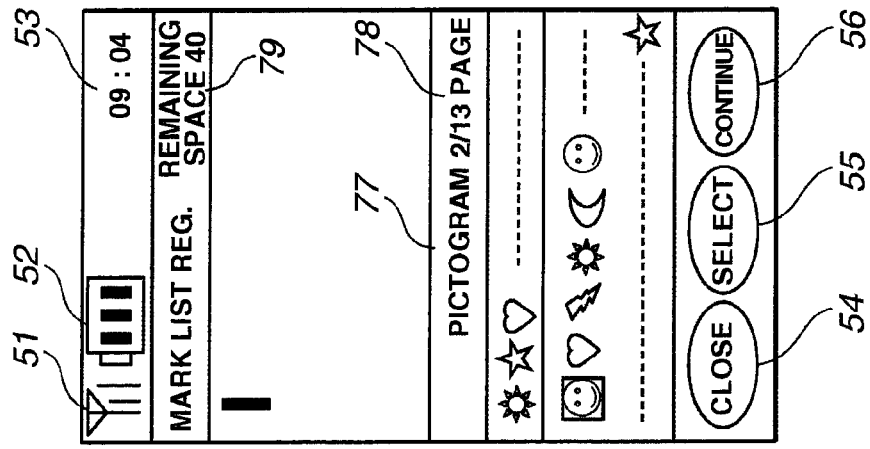
FIGS. 8A to 8C show an example of display on the display screen 5 when a mark list is registered manually.

The mark list registration screen is a screen, for example, as shown in FIG. 8A. If there are any symbols and pictograms currently registered in the mark list, that is, if there are any symbols and pictograms stored in the mark list information storage unit 115b, those symbols and pictograms are displayed on the screen in ordered arrangement. FIG. 8A shows an example of the initial state where no symbol or pictogram has been registered in the mark list.

Once the registration screen is displayed, symbols and pictograms which are frequently used are registered in the mark list (step S207). The registration can be performed in the following manner. The "*" key 62 is pressed according to a guide message 73 in FIG. 8A which indicates that the symbol list is accessed by pressing the "*" key 62. Thereby, the symbol and pictogram list is retrieved from the symbol and pictogram information storage unit 115a and displayed on the display screen 5.

When the "*" key 62 is pressed once, the symbol list is displayed. The symbol list consists of several pages, and these pages can be switched over by using the browser key 69 or the mail key 68.

Figure 8B:
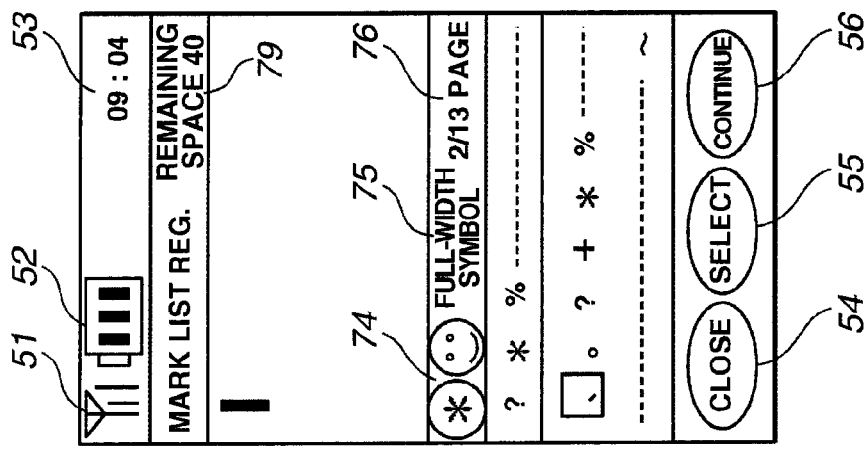

FIG. 8B shows an example of display on the display screen 5 when the symbol list is accessed by pressing the "*" key 62 once in the state shown in FIG. 8A. There are displayed, in a symbol list display field of FIG. 8B, symbols corresponding to the encircled numeric characters "1" to "18" in the table of FIG. 11B. There are also displayed, in a history display field, the symbols which have been selected in the past from all the pages of the symbol list, chronologically from the latest to the oldest.

The display screen 5 of FIG. 8B also displays a guide display 74 indicating that the pictogram list can be accessed by pressing the "*" key 62 once again, a guide display 75 indicating that full-width characters are currently displayed, a guide display 76 indicating that the second page of the symbol list consisting of 13 pages is currently displayed, and a guide display 79 indicating how many more full-width symbols can be registered in the mark list.

In the initial state, the cursor is placed on the first symbol in the symbol list. The guide display 79 need not necessarily indicate the remaining space in the mark list by a number of full-width symbols, and may indicate the same by a number of bytes.

Figure 8C:
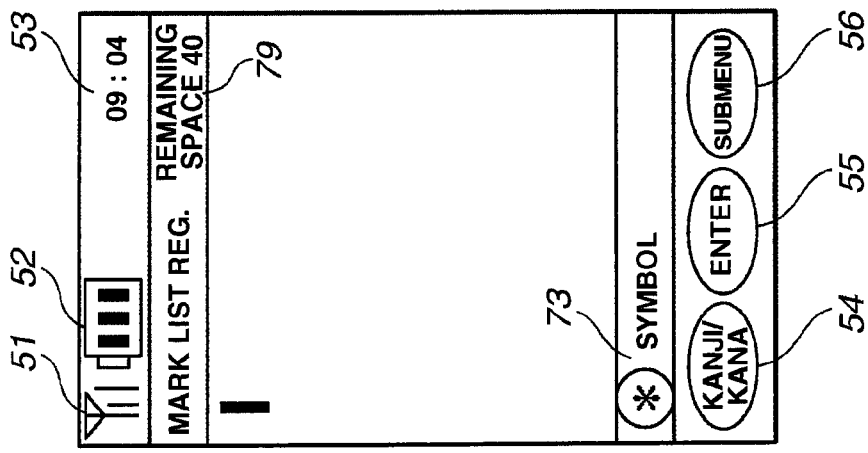

When the "*" key 62 is pressed once again in the display state as shown in FIG. 8B, the pictogram list is displayed as shown in FIG. 8C. FIG. 8C shows an example of display when the pictogram list is accessed.

There are displayed, in a pictogram list display field of FIG. 8C, the pictograms corresponding to the encircled numeric characters "1" to "18" in the table of FIG. 11. There are also displayed, in a history display field, the pictograms which have been selected in the past from all the pages of the pictogram list, chronologically from the latest to the oldest.

The pictogram list consists of several pages, and these pages can be switched over by using the browser key 69 or the mail key 68. The display screen 5 of FIG. 8C also displays a guide display 77 indicating that the pictograms are currently displayed, a guide display 78 indicating that the fifth page of the pictogram list consisting of 13 pages is currently displayed, and the guide display 79 indicating how many more full-width characters can be registered in the mark list.

In the initial state, the cursor is placed on the first pictogram in the pictogram list. The guide display 79 need not necessarily indicate the remaining space in the mark list by a number of full-width pictograms, and may indicate the same by a number of bytes.

In the state as shown in FIG. 8B or FIG. 8C, the cursor is placed on a symbol or pictogram to be registered by using the four-way scroll key 67 and the center key is pressed. Thereby, the symbol or pictogram on which the cursor is placed is registered in the mark list. The mark list information storage unit 115b thus stores information on the symbol or pictogram, and its position or order to be displayed.

The display screen then becomes the state as shown in FIG. 9A, and displays the registered symbol or pictogram. FIG. 9A shows an example of display on the display screen 5 in which the symbol corresponding to the encircled numeric character "1" in FIG. 11B has been registered.

In the state as shown in FIG. 8B or FIG. 8C, the cursor is placed on a symbol or pictogram to be registered, by using the four-way scroll key 67 and the center key is pressed. Thereby, the symbol or pictogram is enabled to be registered continuously. Even after one symbol or pictogram has been registered, the list remains displayed as shown in FIG. 9B.

Figure 11A:
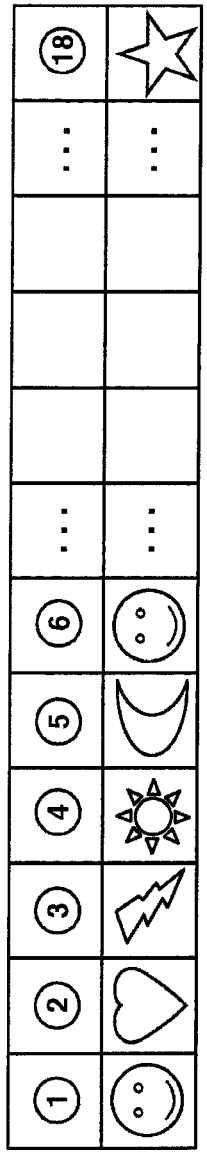
FIGS. 11A to 11D show an example of symbols and characters which are displayed on the display screen when a symbol list, pictograms and a mark list are displayed on the display screen.
Figure 11B:
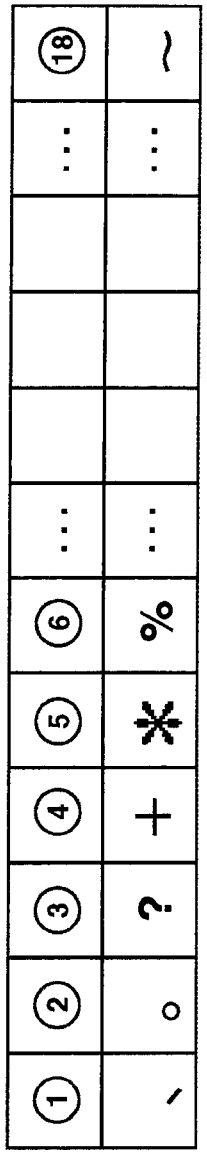
Figure 11C:
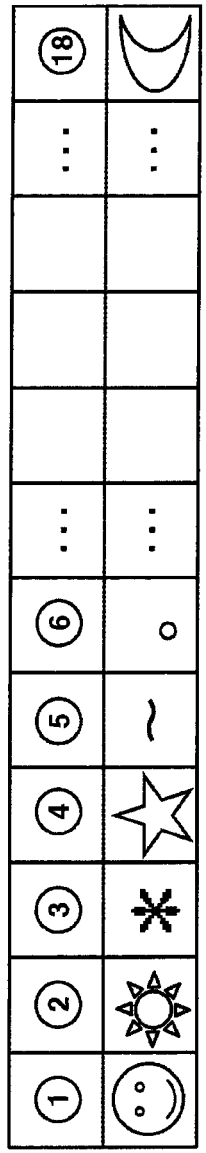
Figure 11D:
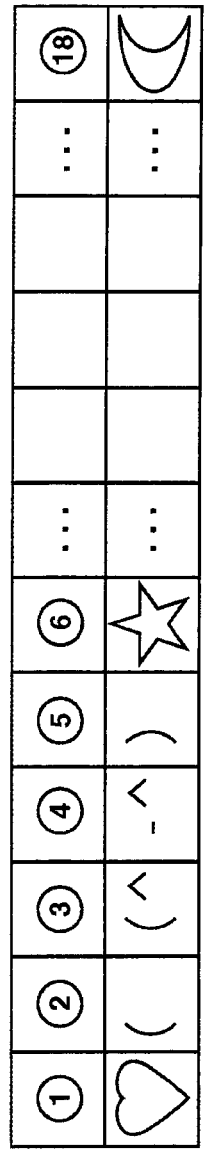

FIG. 9B shows the display state immediately after the symbols corresponding to the encircled numeric characters "1" and "5" in FIG. 11B have been registered in the mark list by pressing the right softkey 66.

Even after a symbol or pictogram has been registered in the mark list, the symbol or pictogram can be deleted from the mark list by placing the cursor on a symbol or pictogram to be deleted and pressing the clear key 72. It is also possible to register symbols pictograms together in a mark list. It is also possible to register one set of several symbols in the mark list as a set symbol. For example, the symbols corresponding to the encircled numeric characters "3" to "5" in FIG. 11D may be registered as a set symbol of "(^-^)", and such set symbol is considered as a kind of "symbol". When a set symbol is selected by using the four-way scroll key 67, all the symbols in the set are highlighted as shown in FIG. 9C.

It will be useless to register again a symbol or pictogram which has been already registered in the mark list. Therefore, before a symbol or pictogram is registered in the mark list information storage unit 115b, the display screen 5 may display a message indicating that the registration is redundant if the symbol or pictogram is already stored in the mark list information storage unit 115b.

It is determined whether or not the registration of symbols and pictograms has been completed (step S208). If the operation to complete the registration has been performed (YES in step S208), the registration is terminated. If the operation to complete the registration has not been performed, the processing returns to step S207. In this manner, the symbols and pictograms can be manually registered in the mark list.

(Automatic Mark List Registration)

Figure 13:
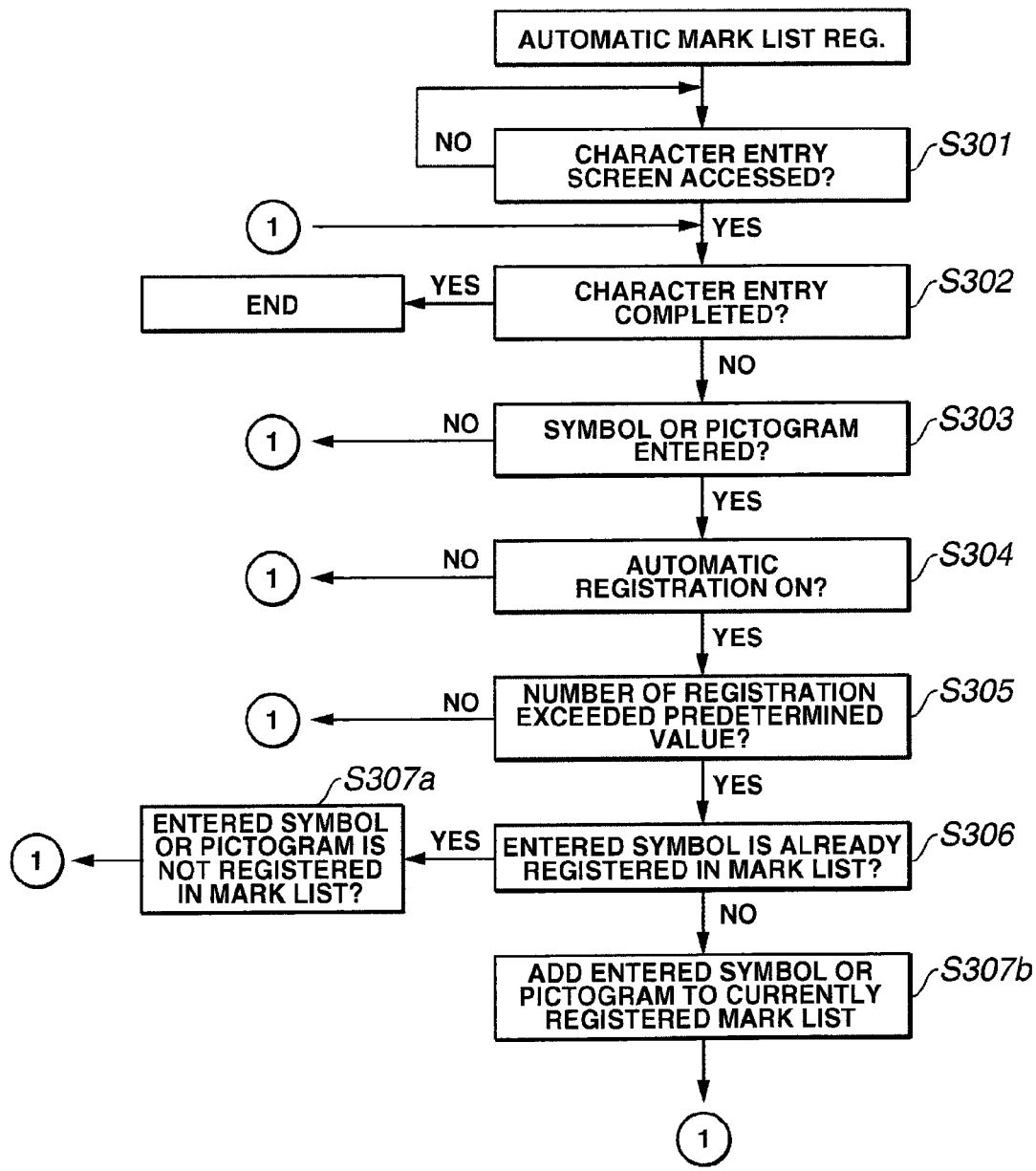
FIG. 13 is a flowchart for registering a mark list automatically.

Description will now be made of automatic registration of a mark list. FIG. 13 is a flowchart illustrating automatic registration of a mark list. According to the automatic mark list registration, a symbol or pictogram which is entered in the course of character entry, the symbol or pictogram is automatically registered in the mark list, that is, automatically stored in the mark list information storage unit 115b.

First, it is determined whether or not a character entry screen has been accessed from among various entry screen functions provided to the mobile phone 1 (step S301). For example, it is determined, in the standby mode, whether the mail text entry screen is accessed by operating the mail key 68, the numeric key 61, and the four-way scroll key 67, or whether a Notepad entry screen is accessed by operating the clear key 72, the numeric key 61, and the four-way scroll key 67.

If it is determined that operation has been done to access the character entry screen (YES in step S301), the control unit 101 then determines whether or not an operation of terminating the entry of characters has been recognized by the entry unit 6 (step S302). If the operation of terminating the entry of characters has been recognized by the entry unit 106 (YES in step S302), the automatic registration is terminated. If the operation of terminating the entry of characters has not been recognized by the entry unit 106 (NO in step S302), the control unit 101 then determines whether or not the operation of entering a symbol or a pictogram has been recognized by the entry unit 106 (step S303).

The method of entering symbols and pictograms is the same as the method described in relation to step S207 of the manual mark list registration. Therefore, detailed description there of will be omitted. If the operation of entering a symbol or a pictogram has not been recognized by the entry unit 106 (NO in step S303), the processing returns to step S302. If the entry of a symbol or a pictogram has been recognized by the entry unit 106 (YES in step S303), the control unit 101 then determines whether or not the automatic mark list registration is set to ON (step S304). The automatic mark list registration is turned ON and OFF in association with the turning ON and OFF of mark list display setting to be described below.

When the mark list display setting is set to ON, the mark list is displayed by pressing the "*" key 62 during the character entry. At the same time, the automatic mark list registration is also set to ON. Whereas, when the mark list display setting is set to OFF, no mark list is displayed even if the "*" key 62 is pressed during the character entry. Although the symbol list is displayed, the automatic mark list registration is set to OFF. The turning ON and OFF of the mark list display setting can be set in advance from a function setting screen (not shown). Even if the automatic mark list registration is preset to ON, the automatic mark list registration will be automatically turned OFF if the upper limit for mark list registration is surpassed.

If the automatic mark list registration has been turned OFF due to the upper limit for mark list registration being surpassed, the automatic mark list registration is automatically set to ON again by deleting some of the registered symbols and pictograms. The turning ON and OFF of the automatic mark list registration need not necessarily be in association with the mark list display setting. The automatic mark list registration may be set to ON and OFF separately and independently from the mark list display setting. Information on the turning ON and OFF of the mark list display setting, and information on the turning ON and OFF of the automatic mark list registration are stored in the storage unit 3 (not shown).

If it is determined, in step S304, that the automatic registration is set to ON (YES in step S304), the control unit 101 determines whether or not the number of symbols and characters recorded in the mark list information storage unit 115b has exceeded a predetermined registration limit vale (step S305). If the number of the symbols and characters recorded in the mark list information storage unit 115b has not exceeded the predetermined value (NO in step S305), the processing returns to step S302. If the number of the symbols and characters recorded in the mark list information storage unit 115b has exceeded the predetermined value (YES in step S305), the control unit 101 determines whether the same symbol or pictogram as the one just entered has been already stored in the mark list information storage unit 115b (step S306).

If it is determined, step S306, that the symbol or pictogram just entered already exists in the mark list information storage unit 115b (YES in step S306), the control unit 101 will not register that symbol or pictogram in the mark list information storage unit 115b even if the automatic registration is set to ON (step S307a). In contrast, if there exists no same symbol or pictogram as the one just entered, the control unit 101 stores the entered symbol or pictogram in the mark list information storage unit 115b (step S307b).

Information is added such that the symbol or pictogram which is newly stored will appear in the list, when displayed, next to the symbols or pictograms previously stored. In this example, it is determined in step S306 whether or not the same symbol or pictogram as the one just entered has been already stored in the mark list information storage unit 115b. Alternatively, however, information on the number of entries of a symbol or pictogram may be stored storage unit 115 to determine whether the number of entries of the symbol or pictogram just entered has exceeded a predetermined value based on the stored information. According to this alternative method, if the number of entries thereof has not exceeded the predetermined value, the processing proceeds to step S307a in which the symbol or pictogram is not registered. In contrast, if the number of entries has exceeded the predetermined value, the processing proceeds to step S307b in which the entered symbol or pictogram is registered.

(Entry of Symbols and Pictograms from the Mark List)

Figure 14:
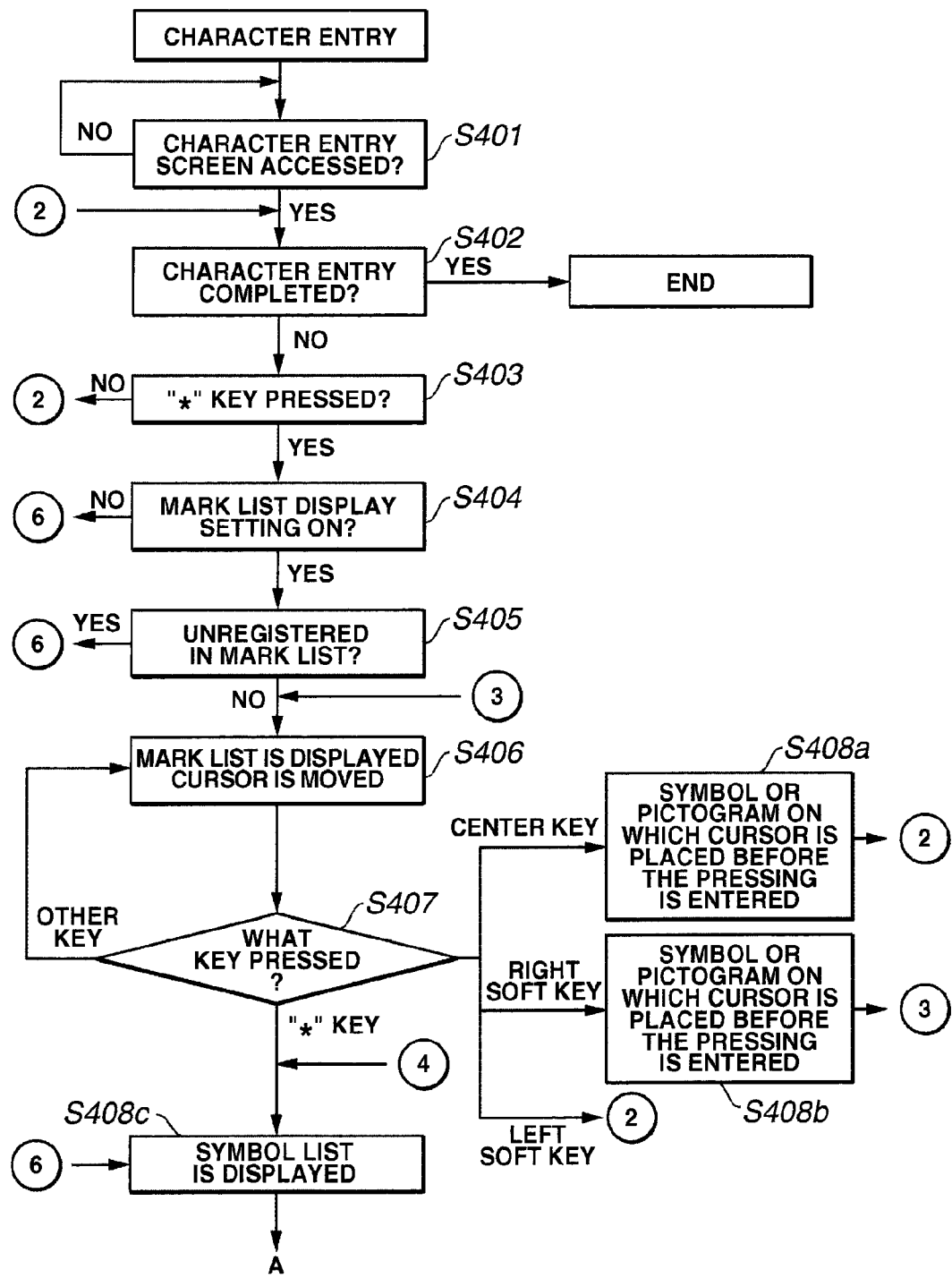
FIG. 14 is a flowchart for entering symbols and pictograms by using the mark list.
Figure 15:
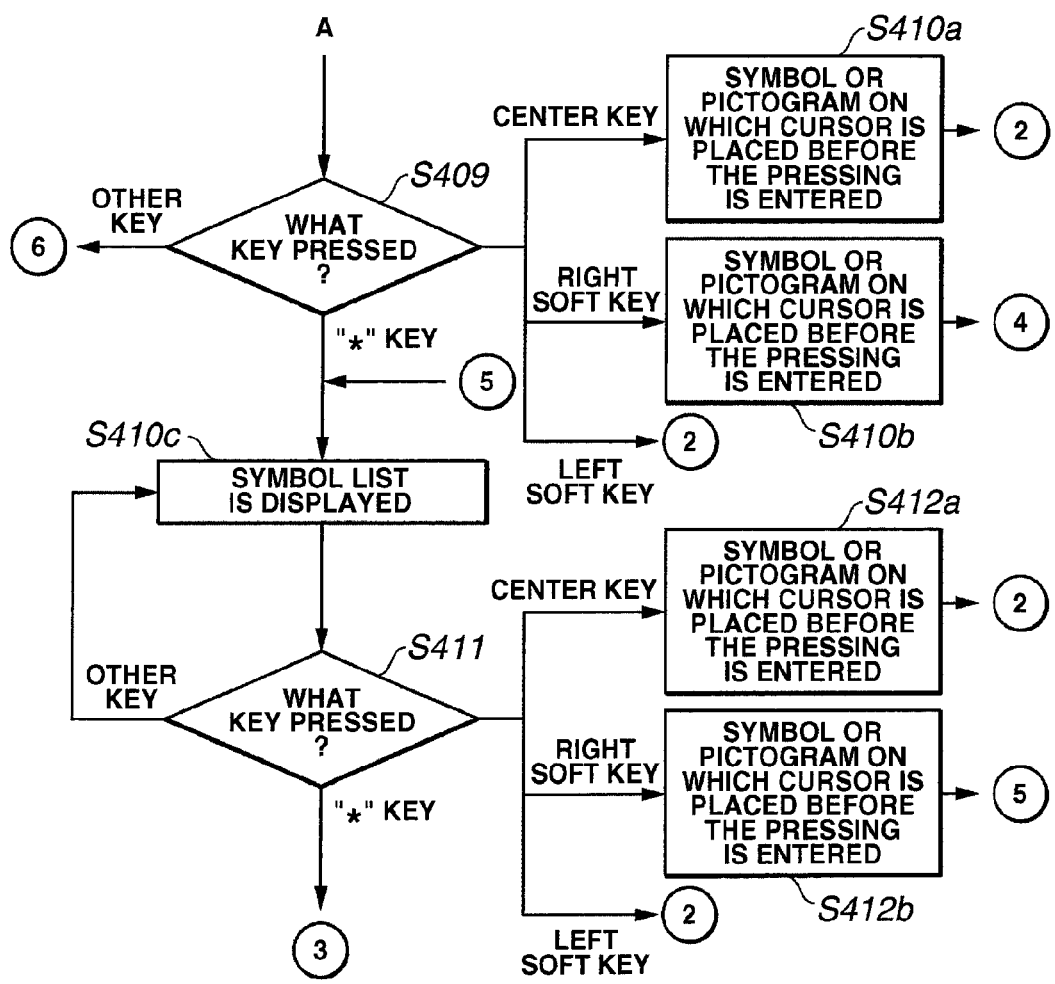
FIG. 15 is a flowchart for entering symbols and pictograms by using the mark list.

Description will now be made of processing of entering symbols and pictograms from the mark list. FIGS. 14 and 15 are flowcharts illustrating processing of entering a symbol or pictogram from the mark list.

First, it is determined whether or not the character entry screen has been accessed from among the various entry screen functions provided to the mobile phone 1 (step S401). For example, it is determined, in the standby mode, whether the mail text entry screen has been accessed by operating the mail key 68, the numeric key 61, and the four-way scroll key 67, or whether the Notepad entry screen has been accessed by operating the clear key 72, the numeric key 61, and the four-way scroll key 67.

If the operation to access the character entry screen has been done (YES in step S401), the control unit 101 then determines whether or not an operation to terminate the entry of characters has been done with the use of the keys 6 and such operation has been recognized by the entry unit 106 (step S402). If the entry unit 106 has recognized the operation to terminate the character entry (YES in step S402), the character entry is terminated.

In contrast, if no operation has been done to terminate the character entry (NO in step S402), the control unit 101 determines whether or not pressing of the "*" key 62 has been recognized by the entry unit 106 (step S403). If the pressing of the "*" key 62 has not been recognized (NO in step S403), the processing returns to step S402.

In contrast, if the pressing of the "*" key has been recognized by the entry unit 106 (YES in step S403), the control unit 101 determines whether or not the mark list display setting is set to ON based on the information on the ON/OFF setting of the mark list display stored in the storage unit 3 (step S404).

If the mark list display setting is OFF in step S404 (NO in step S404), the processing proceeds to step S408c. If the mark list display setting is ON in step S404 (YES in step S404), the control unit 101 then determines whether or not the symbol or pictogram information stored in the mark list information storage unit 115b is unregistered (step S405).

If it is determined, in step S405, that the symbol or pictogram information stored in the mark list information storage unit 115b is unregistered (YES in step S405), the processing proceeds to step S408c. In contrast, if it is determined, in step S405, that the symbol or d pictogram information stored in the mark list information storage unit 115b is not unregistered (step S405 Ø No), the control unit 101 retrieves the symbols and characters stored in the mark list information storage unit 115b and controls the first display control unit 105 to display them on the display screen 5 (step S406).

FIG. 10A shows an example of display on the display screen 5 in this case. There are displayed, in the symbol and pictogram list (mark list list) display field of FIG. 10A, symbols and pictograms corresponding to the encircled numeric characters "1" to "18" in the table of FIG. 11C. There are also displayed, in a history display field, the pictograms which have been selected in the past from all the pages of the pictogram list, chronologically from the latest to the oldest.

The display screen 5 also displays a guide display 80 indicating that the pictogram list can be accessed by pressing the "*" key 62 once again, and a guide display 81 indicating that the symbols and pictograms currently stored in the mark list information storage unit 115b are displayed. The cursor is placed on the symbol corresponding to the encircled numeric character "1" in the initial state.

Once the mark list is displayed as shown in FIG. 10A, the cursor can be moved by using the four-way scroll key 67. The means for laterally moving the cursor is not limited to the four-way scroll key 67. The encircled numeric characters "1" to "9" are associated with the numeric keys for "1" to "9", respectively, and the cursor can also be moved laterally by pressing these numeric keys 61.

The control unit 101 then determines whether or not the pressing of a key 6 has been recognized by the entry unit 106, and further determines the pressing of which key has been recognized (step S407). If it is recognized that the pressed key is the center key of the four-way scroll key 67 or the middle softkey 65, the symbol or pictogram on which the cursor is placed in the display screen 5 when the center key is pressed is determined as the symbol or pictogram to be entered. As shown in FIG. 10C, the mark list is closed and the symbol or pictogram thus entered is displayed. The processing returns to step S402 (step S408a).

If it is recognized that the pressed key is the right softkey 66, the symbol on pictogram on which the cursor is placed in the display screen 5 when the right softkey 66 is pressed is determined as the symbol or pictogram to be entered and, as shown in FIG. 10B, the symbol or pictogram is entered with the mark list remaining displayed. The processing returns to step S406 (step S408b).

If it is recognized that the pressed key is the "*" key 62, the control unit 101 retrieves the symbol list from the symbol and pictogram information storage unit 115a, and controls the first display control unit 105 to display the mark list on the display screen 5 (step S408c). If it is recognized that the left softkey 64 has been pressed, the processing returns to step S402. Further, if it is recognized that the pressed key is a key other than the "*" key 62, the right softkey 66, the left softkey 64, the center key, and the middle softkey 65, the processing returns to step S406.

It is then determined, in step S408c, if any key has been pressed after the display of the symbol list on the display screen 5 and, if any, it is then determined what key has been pressed (step S409). If the pressed key is the center key of the four-way scroll key 67 or the middle softkey 65, the symbol on which the cursor is placed in the display screen 5 when the center key is pressed is determined as the symbol to be entered. The mark list is closed and the entered symbol is displayed on the display screen. The processing returns to step S402 (step S410a).

When the pressed key is the right softkey 66, the symbol on which the cursor is placed in the display screen 5 when the right softkey 66 is pressed is determined as the symbol to be entered. The symbol is entered with the mark list remaining displayed. The processing returns to step S408c (step S410b).

When the pressed key is the "*" key 62, the control unit 101 retrieves the pictogram list from the symbol and pictogram information storage unit 115a, and controls the first display control unit 105 to display the list on the display screen 5 (step S410c). When the pressed key is the left softkey 64, the processing returns to step S402. Further, when the pressed key is a key other than the "*" key 62, the right softkey 66, the left softkey 64, the center key, and the middle softkey 65, the processing returns to step S408c.

It is then determined, in step S410c, whether any key has been pressed after the display of the pictogram list on the display screen 5 and, if any, it is determined what key has been pressed (step S411). When the pressed key is the center key of the four-way scroll key 67 or the middle softkey 65, the pictogram on which the cursor is placed in the display screen 5 when the center key is pressed is determined as the pictogram to be entered. The mark list is closed and the pictogram thus entered is displayed. The processing returns to step S402 (step S412a).

When the pressed key is the right softkey 66, the pictogram on which the cursor is placed in the display screen 5 when the right softkey 66 is pressed is determined as the pictogram to be entered, and the pictogram is entered with the mark list remaining displayed. The processing returns to step S410c (step S412b).

When the pressed key is the "*" key 62, the processing returns to step S406. When the left softkey 64 is pressed, the processing returns to step S402. Further, when a key other than the "*" key 62, the right softkey 66, the left softkey 64, the center key, and the middle softkey 65 is pressed, the processing returns to step S410c.

As described above, according to the present embodiment, the symbols and pictograms which are frequently used by the user can be registered in advance in the mark list information storage unit 115b so that they can be entered easily just by retrieving them from the mark list information storage unit 115b. Thus, the symbols and pictograms can be entered more rapidly than the conventional methods.

The present invention is not limited to the embodiment above. For example, according to the present embodiment, the mark list can be accessed by pressing the "*" key 62 in the text entry screen. However, the mark list may be accessed by pressing a key other than the "*" key 62. Further, the screen display according to the present invention is not limited to the examples as shown in FIGS. 8 to 10.

What is claimed is:

1. A portable information terminal comprising:
   a first memory configured to store at least one of symbol information and pictogram information;
   a display configured to display a first list including a symbol or pictogram based on the information stored in the first memory;
   an key input device including a first key for moving a cursor and a second key;
   a storage control unit which stores the symbol information or the pictogram information corresponding to a symbol or a pictogram by copying the symbol information or the pictogram information stored in the first memory to a second memory, if the symbol or the pictogram is selected via the key input device from the displayed first list;
   a display control unit which, if a given operation is received via the key input device during entry of characters, displays a second list including a symbol or a pictogram corresponding to the information stored in the second memory, and which, if the given operation is received via the key input device while the second list is displayed, displays the first list based on the information stored in the first memory in place of the second list; and
   an input control unit configured to (i) accept a symbol or a pictogram as an input from the first list if the first list is displayed on the display and the symbol or the pictogram is selected from the first list by manipulating the first key and the second key, and (ii) accept a symbol or a pictogram as an input from the second list if the second list is displayed on the display and the symbol or the pictogram is selected from the second list by manipulating the first key and the second key,
   wherein the given operation is different from the process of accepting the symbol or pictogram as the input or selection from the first list or the second list using the first key and second key.

2. The portable information terminal according to claim 1, wherein the first list based on the information stored in the first memory is displayed in a plurality of pages.

3. The portable information terminal according to claim 2, wherein the key input device further includes a third key, and the input control unit (i) continues to accept a symbol or a pictogram from the second list if the previous symbol or pictogram was selected from the second list by manipulating the first key and the second key and (ii) stops accepting a symbol or a pictogram from the second list if the previous symbol or pictogram was selected from the second list by manipulating the first key and the third key.

4. The portable information terminal according to claim 3, wherein the display control unit continues to display the second list if the previous symbol or pictogram was selected from the second list by manipulating the first key and the second key.

5. The portable information terminal according to claim 2, wherein the key input device further includes a third key, and the input control unit (i) continues to accept a symbol or a pictogram from the first list if the previous symbol or pictogram was selected from the first list by manipulating the first key and the second key and (ii) stops accepting a symbol or a pictogram from the first list if the previous symbol or pictogram was selected from the first list by manipulating the first key and the third key.

6. The portable information terminal according to claim 1, wherein the key input device further includes a third key, and the input control unit (i) continues to accept a symbol or a pictogram from the second list if the previous symbol or pictogram was selected from the second list by manipulating the first key and the second key and (ii) stops accepting a symbol or a pictogram from the second list if the previous symbol or pictogram was selected from the second list by manipulating the first key and the third key.

7. The portable information terminal according to claim 6, wherein the display control unit continues to display the second list if the previous symbol or pictogram was selected from the second list by manipulating the first key and the second key.

8. The portable information terminal according to claim 1, wherein the key input device further includes a third key, and the input control unit (i) continues to accept a symbol or a pictogram from the first list if the previous symbol or pictogram was selected from the first list by manipulating the first key and the second key and (ii) stops accepting a symbol or a pictogram from the first list if the previous symbol or pictogram was selected from the first list by manipulating the first key and the third key.

9. A portable information terminal comprising:
   a first memory configured to store at least one of symbol information and pictogram information;
   a display configured to display a first list including a symbol or pictogram based on the information stored in the first memory and a second list including a symbol or pictogram based on the information stored in the first memory;

an key input device including a first key for moving a cursor and a second key;

a storage control unit which stores the symbol information or the pictogram information corresponding to a symbol or a pictogram by copying the symbol information or the pictogram information stored in the first memory to a second memory, if the symbol or the pictogram is selected via the key input device from the displayed first list or second list;

a display control unit which, if a given operation is received via the key input device during entry of characters, displays a third list including a symbol or a pictogram corresponding to the information stored in the second memory, and which, if the given operation is received via the key input device while the third list is displayed, displays the first list based on the information stored in the first memory in place of the third list, and which, if the given operation is received via the key input device while the first list is displayed, displays the second list based on the information stored in the first memory in place of the first list; and an input control unit configured to (i) accept a symbol or a pictogram as an input from the first list if the first list is displayed on the display and the symbol or the pictogram is selected from the first list by manipulating the first key and the second key, (ii) accept a symbol or a pictogram as an input from the second list if the second list is displayed on the display and the symbol or the pictogram is selected from the second list by manipulating the first key and the second key, and (iii) accept a symbol or a pictogram as an input from the third list if the third list is displayed on the display and the symbol or the pictogram is selected from the third list by manipulating the first key and the second key, wherein the given operation is different from the process of accepting the symbol or pictogram as the input or selection from the first list or the second list using the first key and second key.

10. The portable information terminal according to claim 9, wherein the first list based on the information stored in the first memory and the second list based on the information stored in the first memory are displayed in a plurality of pages.

11. The portable information terminal according to claim 10, wherein the key input device further includes a third key, and the input control unit (i) continues to accept a symbol or a pictogram from the third list if the previous symbol or pictogram was selected from the third list by manipulating the first key and the second key and (ii) stops accepting a symbol or a pictogram from the third list if the previous symbol or pictogram was selected from the third list by manipulating the first key and the third key.

12. The portable information terminal according to claim 11, wherein the display control unit continues to display the third list if the previous symbol or pictogram was selected from the third list by manipulating the first key and the second key.

13. The portable information terminal according to claim 10, wherein the key input device further includes a third key, and the input control unit (i) continues to accept a symbol or a pictogram from the first list if the previous symbol or pictogram was selected from the first list by manipulating the first key and the second key and (ii) stops accepting a symbol or a pictogram from the first list if the previous symbol or pictogram was selected from the first list by manipulating the first key and the third key.

14. The portable information terminal according to claim 10, wherein the key input device further includes a third key, and the input control unit (i) continues to accept a symbol or a pictogram from the second list if the previous symbol or pictogram was selected from the second list by manipulating the first key and the second key and (ii) stops accepting a symbol or a pictogram from the second list if the previous symbol or pictogram was selected from the second list by manipulating the first key and the third key.

15. The portable information terminal according to claim 9, wherein the key input device further includes a third key, and the input control unit (i) continues to accept a symbol or a pictogram from the third list if the previous symbol or pictogram was selected from the third list by manipulating the first key and the second key and (ii) stops accepting a symbol or a pictogram from the third list if the previous symbol or pictogram was selected from the third list by manipulating the first key and the third key.

16. The portable information terminal according to claim 15, wherein the display control unit continues to display the third list if the previous symbol or pictogram was selected from the third list by manipulating the first key and the second key.

17. The portable information terminal according to claim 9, wherein the key input device further includes a third key, and the input control unit (i) continues to accept a symbol or a pictogram from the first list if the previous symbol or pictogram was selected from the first list by manipulating the first key and the second key and (ii) stops accepting a symbol or a pictogram from the first list if the previous symbol or pictogram was selected from the first list by manipulating the first key and the third key.

18. The portable information terminal according to claim 9, wherein the key input device further includes a third key, and the input control unit (i) continues to accept a symbol or a pictogram from the second list if the previous symbol or 5 pictogram was selected from the second list by manipulating the first key and the second key and (ii) stops accepting a symbol or a pictogram from the second list if the previous symbol or pictogram was selected from the second list by manipulating the first key and the third key.

* * * * *